United States Patent Office 3,156,478
Patented Nov. 10, 1964

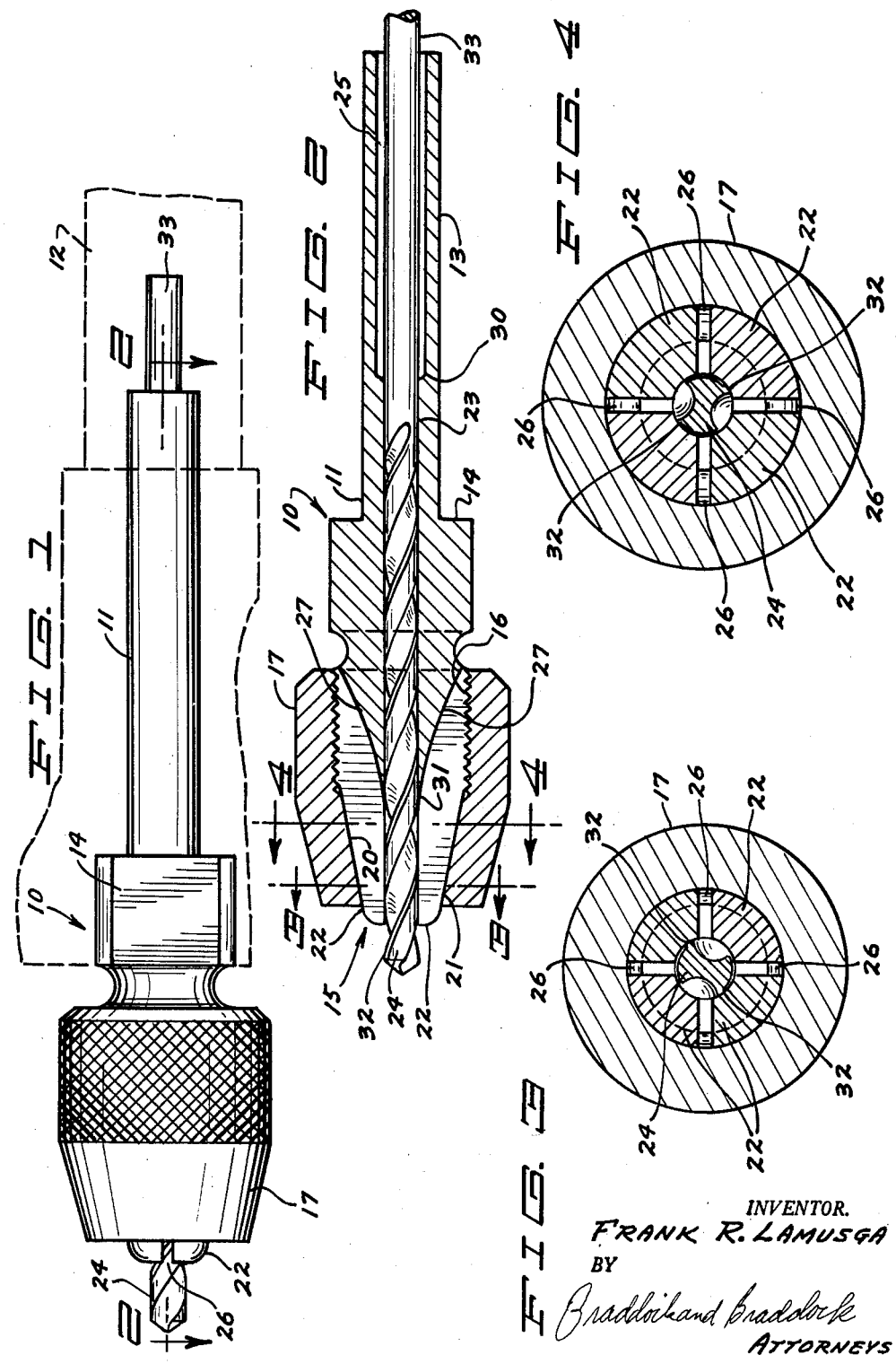

3,156,478
DRILL BIT SUPPORT
Frank R. Lamusga, 3407 Polk St. NE.,
Minneapolis 18, Minn.
Filed May 11, 1961, Ser. No. 109,435
2 Claims. (Cl. 279—42)

The present invention has relation to a drill bit support and more particularly to a support for a drill bit that holds the drill bit securely, straight and exactly concentric with the axis of rotation of the member driving the support. This invention will find most utility with small diameter drills used in close tolerance work.

When using very small diameter drills with conventional drill bit supports, particularly if the drills are made of carbide steel or other hard material, it is almost impossible to position the drill exactly concentric with the chuck of the machine in which it is placed.

The small drill bits most commonly used have two helical cutting edges 180 degrees apart. These small diameter drills break and bend very easily. To minimize damage they must be chucked with only a very small portion of the drill bit extending beyond the chuck. Thus the jaws of the chuck are clamped onto the cutting edges of the drill. When using a chuck with an odd number of jaws, such as a three jaw chuck, the jaws contact the cutting edges of the spiral flutes at points spaced along the longitudinal axis thereof. When the jaws are tightened the load at these staggered load points causes bending moments on the drill and throws the drill off center. In addition, the concentrated load on the cutting edge may chip the edge. Any dirt or other foreign material on the jaws also causes the drill to bend or be chucked eccentric.

If the drill is not concentric it will break or the drilled hole will not be exactly to size. In high precision work this is not allowable. Replacement of broken drills is time consuming and costly. In addition, the drill life is shortened when the drill bit is not concentric with its driving member and the drill consequently has to be sharpened very frequently.

A drill bit support made according to the present invention, in the form as shown, discloses a chuck member that is adapted to be driven by a suitable machine tool. A separate drill bit support is made for each different size of drill. The support has a longitudinal center hole that is substantially the same size as the drill bit used. When the drill bit is inserted into the hole of the drill bit support any particles of dirt or small chips are cleared out and the drill bit will be positioned concentric with the hole. The drill is held snugly and provided with support along a substantial portion of its outer surface.

The drill bit support chuck has four jaws that are equally spaced. When using double fluted drill bits with cutting edges substantially 180 degrees apart, and when the drill bits are chucked on the fluted section, any force exerted by one jaw on one cutting edge is balanced by a substantially equal load directly across the drill bit on the opposite cutting edge from an opposite chuck jaw. Thus there is no bending moment along the longitudinal axis of the drill bit and the drills are clamped with circumferentially balanced loads, the drills are held concentric with the center hole of the chucking member and with the axis of rotation of their driving member.

It is an object of the present invention to present a drill bit support that permits extremely accurate drilling and greatly reduces breakage and wear on the drill bits.

In the drawings,

FIG. 1 is a side elevational view of a drill bit support made according to the present invention and showing a portion of a drill bit supported therein;

FIG. 2 is a longitudinal sectional view of a drill bit support made according to the present invention and taken as on line 2—2 in FIG. 1;

FIG. 3 is an enlarged sectional view taken as on line 3—3 in FIG. 2; and

FIG. 4 is an enlarged sectional view taken as on line 4—4 in FIG. 2.

Referring to the drawings and numerals of reference thereon, a drill bit support illustrated generally at 10 includes a chuck member 11 that is adapted to be inserted into a driving head of a machine tool, such as that illustrated in dotted lines at 12 in FIG. 1. The chuck member includes a shank or tang portion 13 at a first end thereof, an intermediate drive member 14 and a four jaw chuck 15 at a second end thereof. An external thread, indicated at 16, is positioned adjacent a second end of said chuck member. A tightener collar 17 is threadably mounted thereon. The collar 17 has a conical tapered inner surface 20 that fits over a conical tapered outer surface 21 of four jaws 22 of the chuck 15. When the collar 17 is tightened onto the threads 16 of the chuck member the tapered surfaces 20 and 21 collide and the collar acts to tighten jaws 22 of the four jaw chuck together.

The chuck member 11 has a longitudinally axial hole 23 that is of diameter to allow a drill bit 24 to slide therethrough but yet provides a snug fit with the drill bit. A relief hole 25 of larger diameter than hole 23 is provided in the shank or tang portion of the chuck member to permit easy insertion of the drill bit 24.

The jaws 22 of the chuck member 11 are formed by milling a plurality of transverse slots 26 across the first end of the chuck member. The slots are individually cut and each defines a tapered ramp-like section 27, the outer surface of which is formed by the radius of the milling cutter.

The drill bit 24 is supported by the circumferential wall of the hole 23 from the termination of the clearance hole 25, indicated at 30, to the point at which slots 26 intersect hole 23, indicated at 31. The jaws 22 are positioned to contact the leading or cutting edges 32 of a drill bit 24 when they are tightened down. It should be noted that the leading edges 32 of the flutes of the drill bit are the same outside diameter as the main shank 33 of the drill. The rest of the surface area of the flutes is relieved slightly to provide chip clearance for the drill.

*Operation*

When the drill bit support is to be used a drill bit 24, for example a high precision drill bit made of carbide steel or similar hard material, is inserted into the hole 23 of the chucking member 11. The hole 23 is, as stated previously, of dimension to receive the drill bit but provides no appreciable clearance between the drill bit and the interior surfaces of the hole. The axis of the hole is exactly on the longitudinal axis of the chucking member. The drill is slid to its proper position so that the desired amount of the drill is protruding from the four jaw chuck end 15. The collar 17 is then tightened down by turning it on the threads 16. As the collar tightens tapered surface 20 of the collar will tighten onto the tapered surface 21 of the jaws 22 and tend to move the jaws together. The jaws are thus clamped down onto the cutting edges 32, 32 of the drill bit flute. The four jaws 22 of the chuck member 11 exert a balanced load on the drill bit 24. The jaws are of sufficient length so that the leading edges 32 contact the jaws in more than one point. It is to be noted that the four jaws provide for a balanced clamping load force on the drill bit. As shown in FIGS. 3 and 4, every force on one of the leading edges will be directly opposed by an equal force from the opposite jaw 22. The spiral leading edges 32 are then evenly supported by the jaws.

This is a distinct advantage over a three jaw chuck which creates a moment along the longitudinal axis of the drill bit as the points of contact on the cutting edges of the drill are staggered. When used in a three jaw chuck the cutting edges are easily chipped or the drill is bent or thrown center.

As the jaws 22 are tightened the portions of the chucking member adjacent the intersection 32 between the slot 26 and the hole 23 tends to contact and also clamp down onto the leading edges of the flutes of the drill bit. Adjacent wall surfaces 34 of the jaws necessarily move toward each other as the jaws tighten. Thus the tapered ramp section 27 of the slots 26 permit slight movement of the jaws toward each other in this area, causing a uniform load gradient. The inner surfaces of the jaws move uniformly inwardly and the drill is clamped along their entire length.

It should be noted that the drawings illustrating the device of the present invention are enlarged in scale. The actual structures are very small and are used for subminiature work. Thus the actual sections are not large and the drill bits that are used are easily broken by hand.

Using a drill bit support made according to the present invention it has been found that the total indicator reading for the run out of a drill bit measured one-half inch from the end of the four jaw chuck has been under .005 of an inch. Thus it is possible to do precision drilling with this type of drill bit support. In addition, the breakage of drills is greatly reduced as the support for the drill is continuous along the inner surfaces of a hole 23. The four jaw chuck balances the load on the drill and provides very firm support.

What is claimed is:

1. A support for a drill bit having a cylindrical shank and a pair of outer helical cutting edges, said cutting edges lying on an imaginary cylindrical surface concentric with said cylindrical shank, said support including a chucking member adapted to be driven by a rotating machine tool, said chucking member having a longitudinal hole therethrough concentric with the axis of rotation of said machine tool, said hole being of configuration to tightly fit said cylindrical shank and said cutting edges, a first end of said chucking member having a plurality of transverse slots defining an even number of chucking jaws, said slots further defining tapered ramp-like surfaces between said jaws extending from intersections of said slots with said longitudinal hole of said chucking member to an outer surface of said chucking member, said jaws having a conically tapered outer surface, and a collar threadably mounted with respect to said chucking member and having a conically tapered inner surface adapted to collide with said conically tapered outer surface of said jaws to move said jaws inwardly when said collar is threadably moved toward a second end of said chucking member, said ramp-like surfaces being of size so that each of said chucking jaws contracts said drill bit with substantially uniform pressure along the length of said chucking jaws.

2. A support for a drill bit having a cylindrical shank and a pair of outer helical cutting edges, said cutting edges lying on an imaginary cylindrical surface coincidental with said cylindrical shank, said support including an elongated chucking member adapted to be driven by a rotating machine tool, said chucking member having a longitudinal hole therethrough concentric with the axis of rotation of said support, said hole being substantially the same diameter as said shank of said drill bit and adapted to circumferentially support said drill bit along a substantial portion of the length thereof, a first end of said chucking member having a plurality of transverse slots defining four evenly spaced chucking jaws, a portion of each of said slots further defining a tapered ramp-like surface between adjacent jaws extending from an intersection of said slot with said longitudinal hole of said chucking member to an outer surface of said chucking member, said jaws having a conically tapered outer surface, and a collar threadably mounted with respect to said chucking member and having a conically tapered inner surface adapted to collide with said conically tapered outer surface of said jaws to move said jaws inwardly when said collar is threadably moved toward a second end of said chucking member, said slots being of size where they define said ramp-like surfaces so that as each of said jaws is moved inwardly, it contacts said drill bit with a substantially uniform pressure along the length of said jaw.

References Cited in the file of this patent

UNITED STATES PATENTS

| | | |
|---|---|---|
| 508,667 | Woeber | Nov. 14, 1893 |
| 716,177 | Bell | Dec. 16, 1902 |
| 1,306,354 | Robbins | June 10, 1919 |
| 2,359,594 | Turenchalk | Oct. 3, 1944 |
| 2,869,237 | Berge | Jan. 20, 1959 |